(12) United States Patent
Li et al.

(10) Patent No.: US 9,508,109 B2
(45) Date of Patent: Nov. 29, 2016

(54) GRAPHICS PROCESSING

(75) Inventors: Yanxun Li, Shenzhen (CN); Yingliang Jie, Shenzhen (CN); Ying Jiao, Shenzhen (CN); Xiaobin Yang, Shenzhen (CN)

(73) Assignee: NVIDIA CORPORATION, Santa Clara, CA (US)

( * ) Notice: Subject to any disclaimer, the term of this patent is extended or adjusted under 35 U.S.C. 154(b) by 450 days.

(21) Appl. No.: 13/350,681

(22) Filed: Jan. 13, 2012

(65) Prior Publication Data

US 2013/0120406 A1    May 16, 2013

(30) Foreign Application Priority Data

Nov. 14, 2011   (CN) .......................... 2011 1 0359378

(51) Int. Cl.
*G06T 1/00*    (2006.01)
*G09G 5/36*    (2006.01)

(52) U.S. Cl.
CPC ................. *G06T 1/00* (2013.01); *G09G 5/363* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 5,491,480 A | 2/1996 | Jan et al. | |
| 5,943,064 A * | 8/1999 | Hong .......................... | 345/546 |
| 7,545,381 B2 | 6/2009 | Huang et al. | |
| 7,580,040 B2 | 8/2009 | Huang et al. | |
| 7,583,268 B2 | 9/2009 | Huang et al. | |
| 7,750,956 B2 | 7/2010 | Wloka | |
| 2005/0036515 A1 | 2/2005 | Cheung et al. | |
| 2005/0162531 A1 | 7/2005 | Hsu et al. | |
| 2007/0189603 A1 | 8/2007 | Kasperkiewicz et al. | |
| 2008/0030614 A1* | 2/2008 | Schwab et al. ............... | 348/441 |
| 2009/0256965 A1 | 10/2009 | Moote et al. | |
| 2010/0251304 A1* | 9/2010 | Donoghue et al. ............. | 725/46 |
| 2011/0206133 A1 | 8/2011 | Hugosson et al. | |
| 2012/0274808 A1* | 11/2012 | Chong et al. ................. | 348/234 |
| 2012/0293702 A1* | 11/2012 | Siulinski .................. | 348/333.09 |
| 2013/0058412 A1 | 3/2013 | Chen et al. | |
| 2013/0322550 A1 | 12/2013 | Symes | |
| 2015/0117536 A1 | 4/2015 | Yu et al. | |

FOREIGN PATENT DOCUMENTS

| | | |
|---|---|---|
| CN | 2831656 Y | 10/2006 |
| CN | 1912926 A | 2/2007 |
| CN | 1912926 A | 2/2007 |
| CN | 201063796 Y | 5/2008 |
| CN | 101305620 A | 11/2008 |
| CN | 101312527 A | 11/2008 |
| CN | 101472123 A | 7/2009 |
| CN | 101472123 A | 7/2009 |
| CN | 201611480 U | 10/2010 |
| CN | 201765584 U | 3/2011 |
| CN | 201846416 U | 5/2011 |

OTHER PUBLICATIONS

Ma Dejun; "College Computer Basics"; Aug. 31, 2011; p. 44.
Tan Yang; "Computer Installation and Maintenance"; Oct. 31, 2010; pp. 133-134 and 261-269.

* cited by examiner

*Primary Examiner* — Maurice L McDowell, Jr.
*Assistant Examiner* — Donna J Ricks

(57) ABSTRACT

An embodiment of the present invention includes a device for real-time graphics processing. The device includes an interface coupled to exterior for receiving external data. The device includes a data converter coupled to the interface for converting the external data received from the interface. The device includes a graphics processing unit coupled to the data converter to process the external data that has been converted.

20 Claims, 5 Drawing Sheets

GRAPHICS PROCESSING

CROSS-REFERENCE TO RELATED APPLICATION

This patent application claims the benefit and priority of the co-pending Chinese Patent Application No. 201110359378.7, by Yanxun L I et al., filed on Nov. 14, 2011, which is hereby incorporated by reference.

BACKGROUND

Graphics processing units (GPUs) contain hundreds of arithmetic units and are able to provide tremendous acceleration for many numerically intensive scientific applications. The key to effective utilization of GPUs for video processing is the design and implementation of efficient data-parallel algorithms that can scale to hundreds of tightly coupled processing units. Many image and video processing applications are well suited to GPUs, due to their extensive computational requirements, and because they lend themselves to parallel processing implementations. The use of GPUs can provide tremendous speed increases over a central processing unit (CPU) in some implementations and without any compromise in final image quality.

The explosive growth of digital video content from commodity devices and on the Internet has precipitated a renewed interest in video processing technology, which broadly encompasses the compression, enhancement, analysis, and synthesis of digital video. Video processing is computationally intensive and often has accompanying real-time or super-real-time requirements. For example, surveillance and monitoring systems need to robustly analyze video from multiple cameras in real time in order to automatically detect and signal unusual events. Moreover, continued growth of functionality and speed of video processing systems will likely further enable novel applications.

Due to the strong computational locality exhibited by video algorithms, video processing is highly amenable to parallel processing. For instance, what appears on the 10th frame of a video sequence does not strongly affect the contents of the 1000th frame in time; and in space, an object on the left side of single frame does not strongly influence the pixel values on the right. Such locality makes it possible to divide video processing tasks into smaller, weakly interacting pieces amenable to parallel processing. Furthermore, these pieces can share data to economize on memory bandwidth.

When doing video encoding, a GPU will get video data from a CPU. The video data is copied from a system memory to a graphics memory on a graphics card via Peripheral Component Interconnect Express (PCIe), which may consume time and be limited by the speed of PCIe. FIG. 1 is a block diagram illustrating the framework of an existing graphics card system 100. In the graphics card system 100, a video camera 102 captures external video data, which is transmitted through a CPU 101 and stored in a system buffer 103. When it is necessary for processing, the video data is read from the system buffer 103 by a graphics processing unit (GPU) 105 through an interface 104 and then stored in a frame buffer 106 for further processing, which is customized for graphics storage. This technique is inadequate for a request of real-time and high-speed processing of video data.

SUMMARY

For a request of real-time and high-speed video processing, an embodiment in accordance with the invention includes a graphics processing system for real-time processing of captured video data, namely a novel USB-camera graphics card with 'Video-in' function. Based on the current design of graphics cards, it is found that most graphics cards only have output display ports without any video input function for real-time video capture.

Various embodiments in accordance with the present invention relate generally to digital processing for image and video signals and, in particular, to a method and system for real-time graphics processing. In one embodiment, utilizing the graphics processing device with video input ports enable the captured video signal to be directly transmitted to a memory of the graphics processing device and processed by the graphics processing unit (GPU) without data transmission between a central processing unit (CPU) and the GPU. According to the device and method of various embodiments of the present invention, the speed of real-time graphics processing is substantially improved.

In one embodiment of the invention, a graphics processing device used for real-time video processing is provided, the graphics processing device comprises: an interface coupled to exterior for receiving external data; a data converter coupled to the interface for converting the external data received from the interface; and a graphics processing unit coupled to the data converter to process the external data that has been converted.

In an embodiment, the graphics processing device further comprises a power supply for supplying power to the graphics processing unit and the data converter.

In an embodiment, the data converter is used for converting serial video data into parallel video data.

In an embodiment, the external data is video data captured by a peripheral camera.

In an embodiment, the interface is selected from at least RS-232 (Recommended Standard 232), USB (Universal Serial Bus), IEEE 1394 and Infrared.

In an embodiment, the interface is a wired or wireless network interface supporting network protocol.

In another embodiment of the invention, a real-time graphics processing method is provided for a graphics processing device. The device comprises an interface coupling to exterior for receiving external data; a data converter coupling to the interface and converting external data received from the interface; and a graphics processing unit coupling to the data converter to process the external data that has been converted. The method comprises the steps of: starting and configuring the graphics processing unit; monitoring by the graphics processing unit whether there is a request for capturing external data; configuring the interface and the data converter by the graphics processing unit when there is a request for capturing external data; capturing data from exterior by the interface; converting the captured data by the data converter; and transmitting the converted video data to the graphics processing unit by the data converter.

In an embodiment, the graphics processing unit is operable for responding to interrupt processes.

In an embodiment, the configuring of the interface and the data converter by the graphics processing unit can be executed simultaneously or in sequence.

In an embodiment, the data converter includes both the interface function and the data conversion function.

In another embodiment of the invention, a computer system is provided for real-time graphics processing. The computer system comprises: an interface coupled to an exterior resource; a memory for storing a plurality of instructions; a central processing unit for executing the plurality of instructions; a data converter coupled to the interface for converting external data received from the interface; and a graphics processor unit coupled to the data converter for processing the external data that has been converted.

In an embodiment, the computer system further comprises a power supply for supplying power to the graphics processing unit and the data converter.

The graphics processing device in accordance with various embodiments of the present invention can be provided with ordinary video input ports, such as USB interface, in order to conveniently have both video capturing and processing functions. The video input ports enable users to couple to ordinary video devices, for instance, a USB camera, a mobile telephone with a USB interface and camera/video function, or a tablet personal computer (tablet PC), etc.

Additional features and advantages of various embodiments in accordance with the invention will be set forth in the description that follows, and in part will be apparent from the description, or may be learned by practice of various embodiments in accordance with the invention. The advantages of various embodiments in accordance with the invention can be realized and attained by the structure particularly pointed out in the written description and claims hereof as well as the appended drawings.

It is to be understood that both the foregoing general description and the following detailed description are exemplary and explanatory and are intended to provide further explanation of various embodiments in accordance with the invention as claimed.

While particular embodiments in accordance with the invention have been specifically described within this Summary, it is noted that the invention and the claimed subject matter are not limited in any way by these embodiments.

BRIEF DESCRIPTION OF THE DRAWINGS

The accompanying drawings are included to provide a further understanding of various embodiments in accordance with the invention, and are incorporated in and constitute a part of this specification. The drawings illustrate various embodiments of the invention and, together with the description, serve to explain the principles of various embodiments in accordance with the invention.

DETAILED DESCRIPTION

Figure 1:
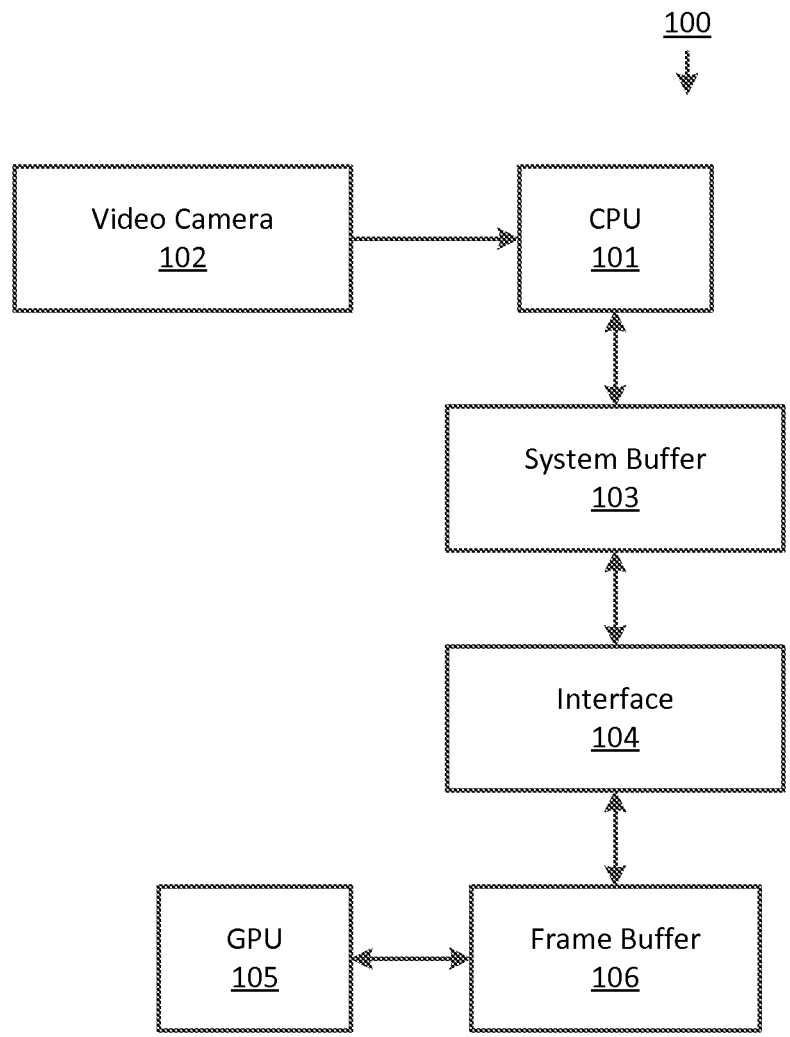
FIG. 1 is a block diagram illustrating the framework of an existing graphics card system.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details or with equivalents thereof. In other instances, well known methods, procedures, components, and circuits have not been described in detail as not to unnecessarily obscure aspects of the invention.

Various embodiments in accordance with the present invention relate generally to digital processing for image and video signal and, in particular, to a method and system for real-time graphics processing.

The graphics processing device according to an embodiment of the present invention can be used for real-time and high-speed processing of captured graphics data. The graphics data is enabled to be captured directly from a video capture device and transmitted directly to a memory of a graphics processing device by arranging particular video data ports on the graphics processing device. According to the graphics processing device of an embodiment of the present invention, the transmission of the captured video data between a CPU and a GPU is avoided, which leads to a decrease of the processing time, and improves the efficiency of graphics processing, especially real-time graphics processing.

The graphics processing device of an embodiment of the present invention can be provided or implemented with well used video input ports, such as USB interface, in order to conveniently have both video capturing and processing functions. The video input ports enable users to couple an ordinary video device, for instance, a USB camera, a mobile telephone with a USB interface and camera/video function, or a tablet PC, etc.

Various exemplary embodiments are described herein in the context of systems and methods for a novel USB-camera graphics card with 'Video-in' function. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or the like element.

Reference will now be made in detail to various embodiments of the present invention, examples of which are illustrated in the accompanying drawings.

Figure 2:
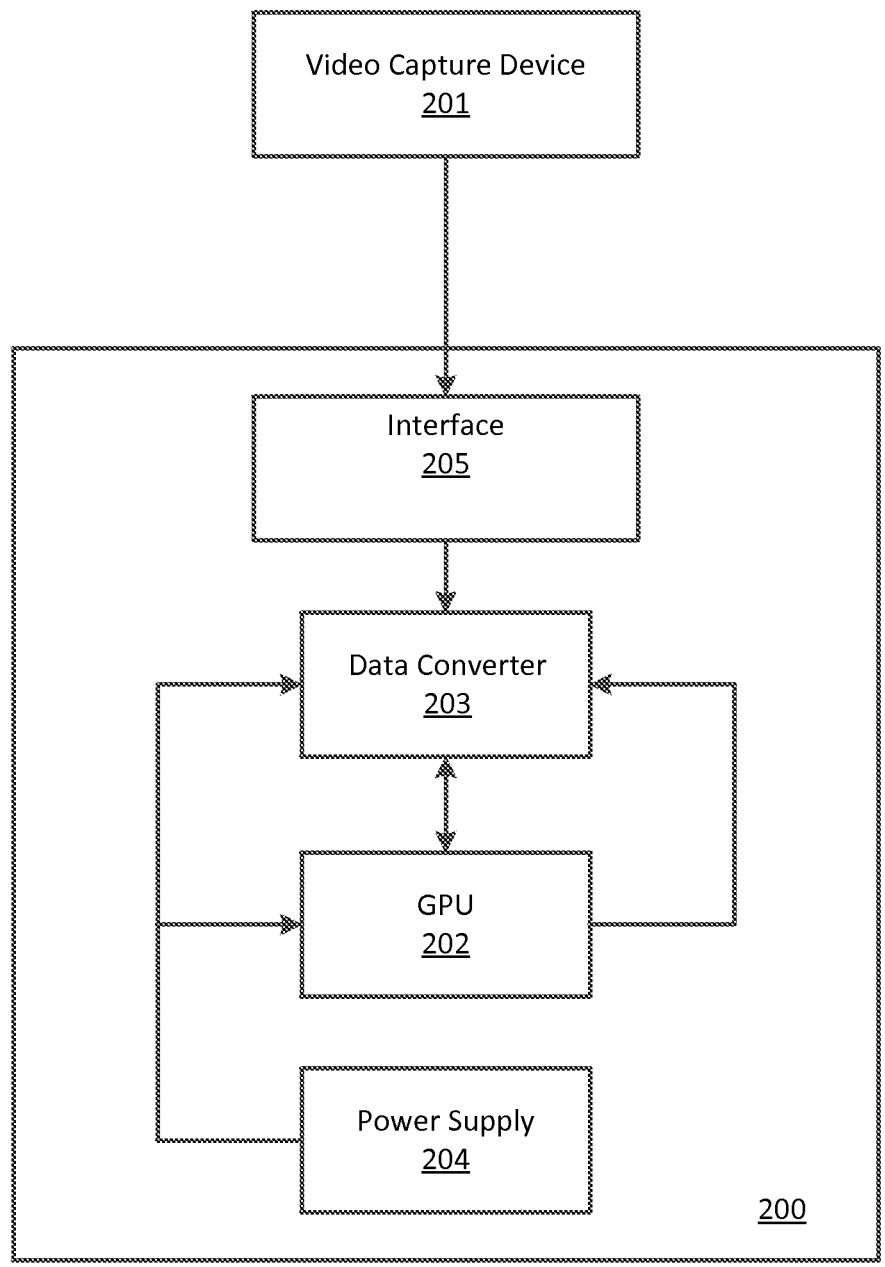
FIG. 2 is a block diagram of a particular embodiment of a graphics processing device in accordance with the present invention.

FIG. 2 is a block diagram of a particular embodiment of a graphics processing device 200 in accordance with the present invention. As illustrated in FIG. 2, a graphics processing device 200 in an embodiment of the present invention includes a graphics processing unit (GPU) 202, a data converter 203, a power supply 204 and an interface 205. The data converter 203 couples with the GPU 202 and the interface 205 to convert the received graphics data. The power supply 204 couples with the GPU 202 and the data converter 203 to supply power to them. For ease of understanding, only the components pertinent to an understanding of the operation of the example embodiment are included and described. However embodiments covered by several aspects of the present invention can contain fewer or more components. Each component of FIG. 2 is described in detail as follows.

As illustrated in FIG. 2, the graphics processing device 200 in an embodiment of the present invention includes a graphics processing unit (GPU) 202, which is used to control the operation of each block unit of the graphics processing device 200 by executing instructions. For instance, the GPU 202 sends instructions in order to transmit the data captured by a video capture device 201 or other peripheral devices through the interface 205. The GPU 202 additionally sends a control signal to the data converter 203 to control data conversion performed by the data converter 203.

In an embodiment, the video capture device 201 can be a USB camera, a mobile telephone with a USB interface and camera/video function, or a tablet PC, etc., to capture video and/or image data, which is transmitted to the graphics processing device 200 for further processing.

In an embodiment, the interface 205 is used for data transmission and exchange between the graphics processing device 200 and the video capture device 201 or other peripheral devices. The interface 205 is selected at least from various peripheral interfaces for data transmission known in the relevant arts, for example, RS-232, USB, IEEE 1394, Infrared, etc., to enable the graphics processing device 200 to couple with various peripheral video capture devices supporting respective protocols. The interface 205 can additionally be a wired or wireless network interface, for instance, Bluetooth, LAN interface, fibre interface, etc.

In an embodiment, the data converter 203 is used to convert the video data captured by the video capture device 201 through the interface 205. In one embodiment, for example, when the captured video data comes from a USB camera, the data captured by the video capture device 201 is serial data, while the data supplied for further processing by the GPU 202 should be parallel data. As such, the captured serial data have to be converted into parallel data by the data converter 203 for further processing by the GPU 202. Naturally, in an embodiment, it is apparent to one skilled in the relevant arts that the data converter 203 is not needed if the data captured by the peripheral video capture device 201 meets the required format for direct processing by the GPU 202.

In an embodiment, the power supply 204 is arranged in the graphics processing device 200 to supply power to each functional component and element, for example, the GPU 202 and the data converter 203 of the graphics processing device 200.

Figure 3:
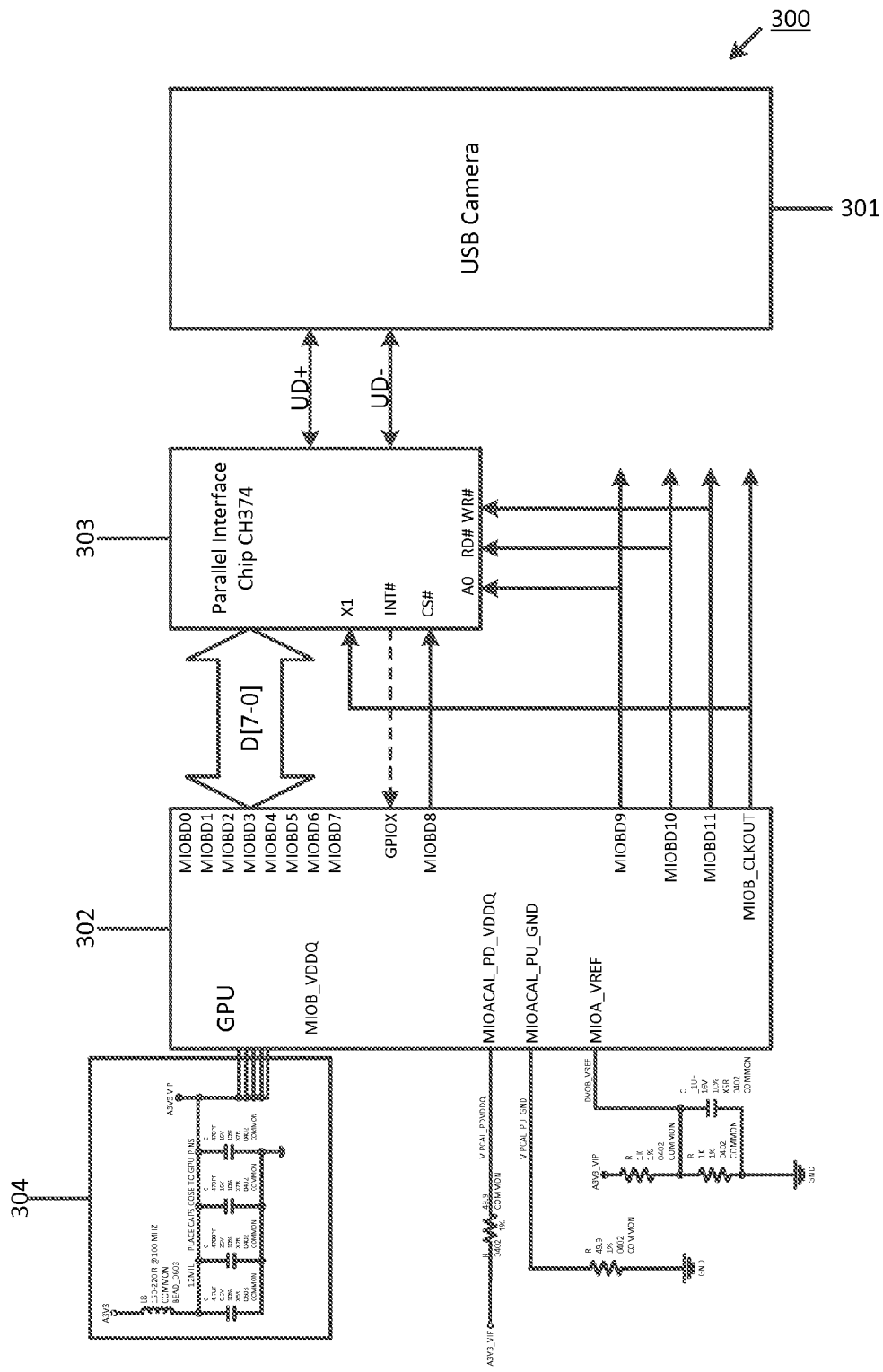
FIG. 3 is a circuit of a particular embodiment of a graphics processing device in accordance with the present invention.

FIG. 3 is a circuit of a particular embodiment of a graphics processing device 300 in accordance with the present invention. As illustrated in FIG. 3, the graphics processing device 300 according to this embodiment comprises a graphics processing unit (GPU) 302, a data converter 303 and a power supply 304. The data converter 303 is implemented by a parallel interface chip CH 374 according to this embodiment, which is compatible with a data converting function of serial data and parallel data and an interface function of the USB camera 301. The power supply 304 couples to the GPU 302 for supplying power to it.

In an embodiment, when power is supplied to the graphics processing device 300, the GPU 302 sends control instructions to a parallel interface chip, namely the data converter 303, through interfaces such as MIOBD8, MIOBD9, MIOBD10 and MIOBD11, to receive the video stream data UD in serial data format from the USB camera 301. The video stream data is converted to be appropriate for direct processing by the GPU 302 by the parallel interface chip 303, namely a data D[7-0], and is inputted subsequently into data interfaces MIOBD0-MIOBD7 of the GPU 302. It is 8 bit parallel data as illustrated in FIG. 3, but embodiments of the present invention can be used for processing graphics of any other widths, such as 16 bit and 32 bit, etc., which is apparent to one skilled in the relevant arts. When the data D[7-0] is received, it can be directly processed by the GPU 302 without reading data from the other cache for CPU instructions, leading to a decrease of the data processing time and increasing the efficiency of the data processing, and a possibility of real-time processing of video stream data.

Figure 4:
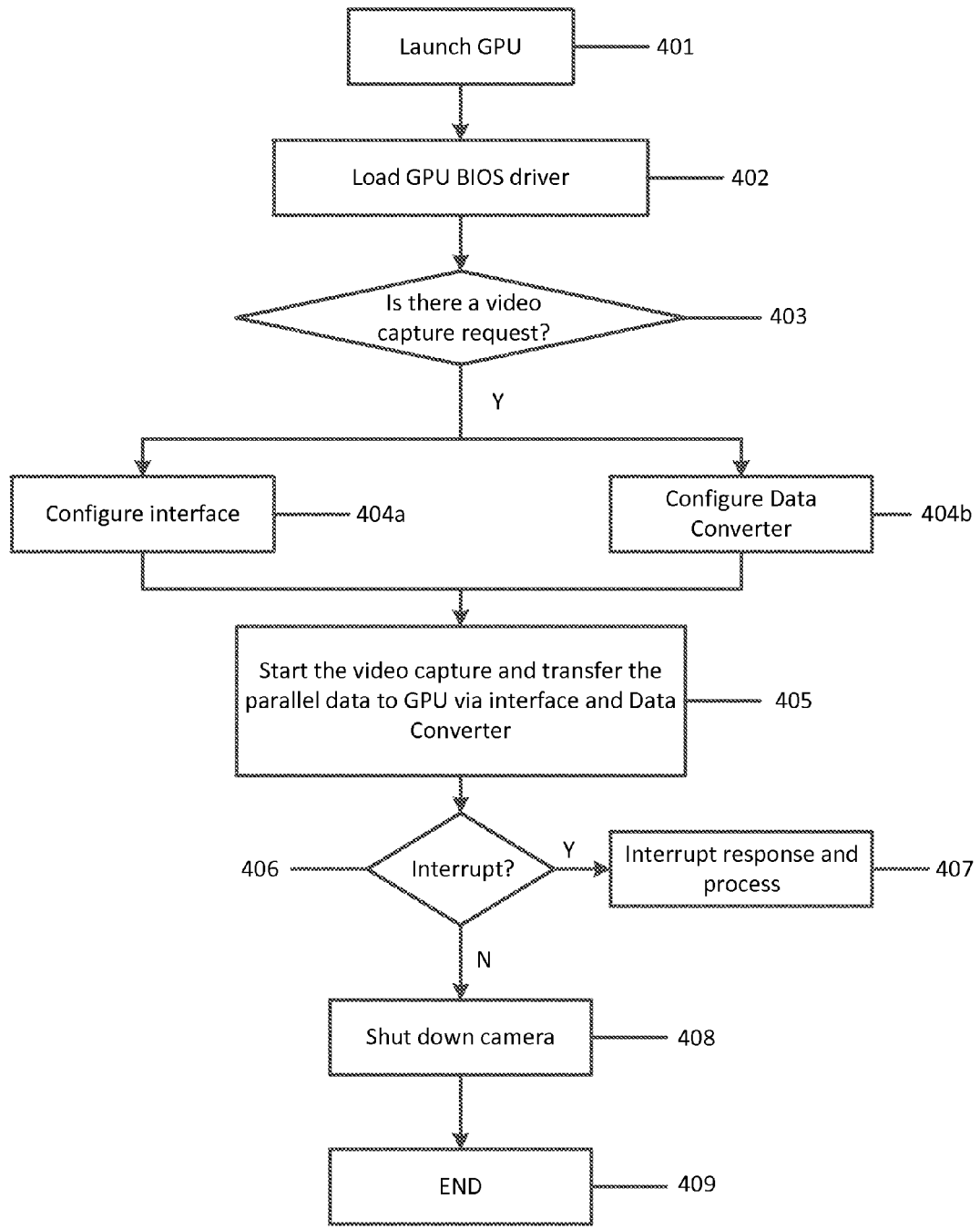
FIG. 4 is a flow chart of a real-time video processing method according to an embodiment of the present invention.

FIG. 4 is a flow chart of a real-time video processing method according to an embodiment of the present invention. The flow chart illustrated in FIG. 4 is only for explanation. However, various features can be implemented in other environments and other components. Moreover, the particular order of the represented procedures is only for explanation. It should be appreciated that various modifications, adaptations and alternative embodiments thereof may be made within the scope and spirit of the present invention, as will be apparent to one skilled in the relevant arts.

The flow chart begins at step 401, wherein power is applied and the GPU starts up.

In step 402, the GPU is put in working order, that is to say, the BIOS (basic input/output system) and drivers of the GPU are loaded into its cache for putting the GPU in working order.

In step 403, the GPU monitors whether there is request for capturing external data and, specifically, monitors whether a peripheral camera sends a request for capturing video. If the request is not received, the GPU will wait until the request appears. If the request appears, step 404 will be executed.

Step 404 comprises two sub-steps, namely steps 404a and 404b. In step 404a, the GPU sends a control signal to a configuration register for configuring the interface of the graphics processing device and the peripheral camera. In step 404b, the GPU sends a control signal to a configuration register for configuring the data converter, namely the chip for converting serial data into parallel data. Alternatively, in an embodiment, step 404a and step 404b can be combined into one independent step when the data converter is compatible with an interface function and a data conversion function. If the graphics processing device includes an individual interface and a data converter unit, the GPU is capable of configuring them respectively and step 404 is divided into two sub-steps, namely steps 404a and 404b. The configuration steps can be executed simultaneously or in sequence.

When each of the registers and the corresponding interfaces and data converter units has been configured in step 404, the camera is started up for capturing video in step 405. Additionally, in step 405, the interface receives the video from the peripheral camera and transfers it to the data converter unit, which converts the video from serial data into parallel data. Also, in step 405, the data converter unit transfers the parallel data to the GPU for further processing.

Alternatively, the GPU may respond to an interrupt processing, as shown in step 406. The GPU responds to an interrupt request and subsequently executes step 407 of the interrupt response and process.

In step 408, the camera is shut down following an accomplishment of the data processing by the GPU, and the process ends in step 409.

It should be appreciated that the method represented in the present invention can be implemented in various environments.

Figure 5:
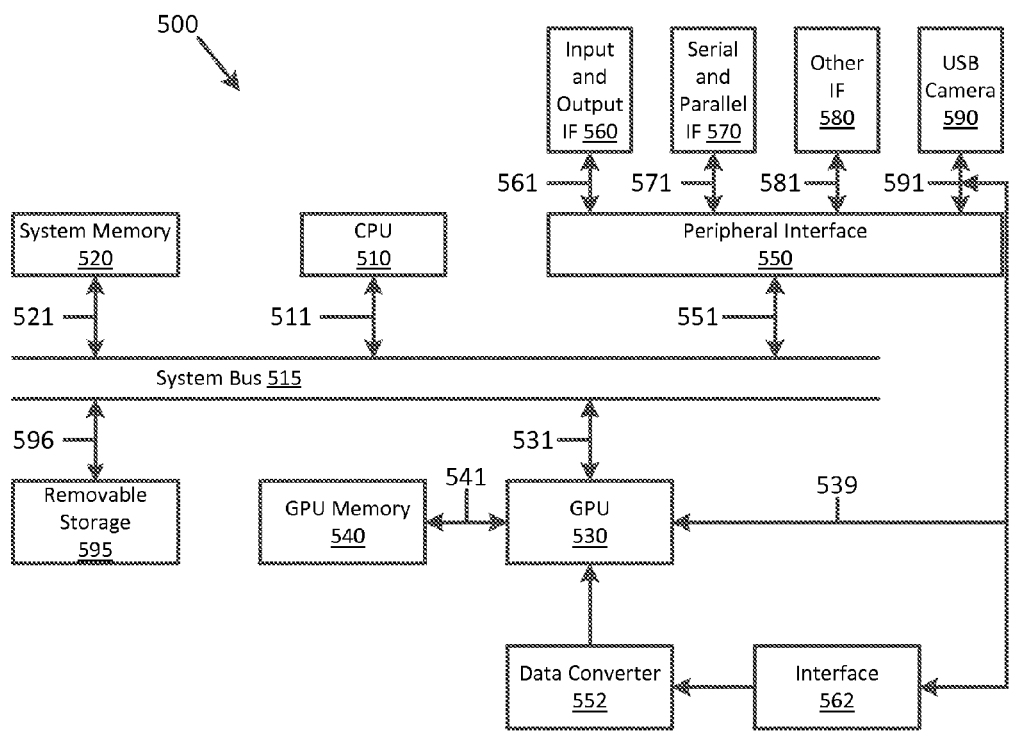
FIG. 5 is a block diagram illustrating a computer system with a real-time video processing method according to an embodiment of the present invention.

FIG. 5 is a block diagram illustrating an example environment in which several features in accordance with an embodiment of the present invention may be implemented. The example environment is shown containing only representative systems for illustration. However, real-world environments may contain more/fewer/different systems/components as will be apparent to one skilled in the relevant arts. Implementations in such environments are also contemplated to be within the scope and spirit of various embodiments of the present invention.

A device 500 is shown containing a CPU 510, a system memory 520, a graphics processing unit (GPU) 530, a GPU memory 540, a peripheral interface 550, and a removable storage 595. For conciseness and ease of understanding, only the components pertinent to an understanding of the operation of an example embodiment are included and described. However embodiments covered by several aspects of the present invention can contain fewer or more components. Each component of FIG. 5 is described in detail below.

In an embodiment, the CPU 510 represents a central processor(s) which at least in substantial respects controls the operation (or non-operation) of the various other blocks (in the device 500) by executing instructions stored in the system memory 520. Some of the instructions executed by the CPU 510 also represent various user applications (e.g., playing songs/video, video recording, etc.) provided by the device 500.

In an embodiment, the system memory 520 contains various randomly accessible locations which store instructions and/or data used by the CPU 510. As noted above, some of the instructions may represent user applications. Other instructions may represent an operating system (containing or interfacing with device drivers), etc. The system memory 520 may be implemented using one or more of SRAM (static random access memory), SDRAM (synchronous dynamic random access memory), DDR (double data rate) RAM, etc. Specifically, pixel values that are to be processed and/or to be used later may be stored in the system memory 520 via a path 521 by the CPU 510.

In an embodiment, the removable storage 595 may store data (e.g., captured video or audio or still images, etc.) via path 596. In one embodiment, the removable storage 595 is implemented as a flash memory. Alternatively, in an embodiment, the removable storage 595 may be implemented as a removable plug-in card, thus allowing a user to move the stored data to another system for viewing or processing or to use other instances of plug-in cards.

In an embodiment, the removable storage 595 may contain an additional memory unit (e.g., ROM (read only memory), EEPROM (Electrically Erasable Programmable Read Only Memory), etc.), which store a plurality of instructions, which when executed by the CPU 510 and the GPU 530 provide various features in accordance with various embodiments of the invention described herein. In general, such a memory unit (including RAMs, non-volatile memory, removable or not) from which instructions can be retrieved and executed (by CPU or GPU) are referred to as a computer readable medium. It should be appreciated that the computer readable medium can be deployed in various other embodiments, potentially in devices, which are not intended for capturing video, audio or images, but providing several features described herein.

In an embodiment, the peripheral interface 550 provides any physical/electrical and protocol interfaces needed for coupling different peripheral devices and/or other systems operating with different protocols. Merely for illustration, the peripheral interface 550 is shown as a single block interfacing with multiple interface blocks. For instance, the peripheral interface 550 includes the USB camera block 590. However, the peripheral interface 550 may contain multiple units, each adapted or implemented for the specific interface block, as will be apparent to one skilled in the relevant arts.

In an embodiment, an input and output (I/O) interface 560 provides a user with the facility to provide inputs to the multi-media device and receive outputs. An input interface (e.g., interface with a keyboard or roller ball or similar arrangements, not shown) provides a user with the facility to provide inputs to the multi-media device, for example, to select features such as whether encoding is to be performed. An output interface provides output signals (e.g., to a display unit, not shown). The input interface and output interface together form the basis of a suitable user interface for a user.

In an embodiment, a serial and parallel interfaces 570 and other interfaces 580 (containing various peripheral interfaces known in the relevant arts, for example RS-232, USB, Firewire, Infrared, etc.) enable the multi-media device to couple to various peripherals and devices using the respective protocols.

In an embodiment, the GPU memory 540 (which may be implemented using one or more of SRAM, SDRAM, DDR RAM, etc.) from which data may be retrieved for processing by the GPU 530. The GPU memory 540 may be integrated with the GPU 530 into a single integrated circuit or located external to it. As an alternative, in an embodiment, the GPU memory 540 may contain multiple units, with some units integrated into the GPU 530 and some external to the GPU 530. In addition to supporting encoding as described in sections below, the GPU memory 540 in an embodiment may be used to store data to support various graphics operations, and to store a present frame based on which display signals are generated to a display unit.

In an embodiment, the graphics processing unit (GPU) 530 is used to operate the data converter 552 and the interface 562 by executing instructions in order to transmit the received data through the interface 562 from the video capturing devices, namely the USB camera 590. The GPU 530 additionally transmits control signals to the data converter 552, in order to control the progressing of data conversion by the data converter 552. The GPU 530 processes converted image or video data to execute operations, and generates display signals to a display unit from the processed/generated graphics data.

In an embodiment, the device 500 includes the CPU 510, system memory 520, system bus 515, peripheral interface 550, input and output interface 560, serial and parallel interfaces 570, other interfaces 580, USB camera 590, interface 562, data converter 552, GPU 530, GPU memory 540, and removable storage 595. The CPU 510 is coupled to the system bus 515 via path 511. The system memory 520 is coupled to the system bus 515 via path 521. The GPU 530 is coupled to the system bus 515 via path 531. The peripheral interface 550 is coupled to the system bus 515 via path 551. The removable storage 595 is coupled to the system bus 515 via path 596. The input and output interface 560 is coupled to the peripheral interface 550 via path 561. The serial and parallel interfaces 570 are coupled to the peripheral interface 550 via path 571. The other interfaces 580 are coupled to the peripheral interface 550 via path 581. The USB camera 590 is coupled to the peripheral interface 550 via path 591. The GPU 530 and the interface 562 are coupled to the USB camera 590. In one embodiment, the GPU 530 and the interface 562 are coupled to the USB camera 590 via paths 539 and 591. The data converter 552 is coupled to the interface 562 and the GPU 530. The GPU memory 540 is coupled to the GPU 530 via path 541.

It should be appreciated that various modifications, adaptations and alternative embodiments thereof may be made within the scope and spirit of the present invention. The invention is further defined by the following claims.

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the Claims and their equivalents.

What is claimed is:

1. A graphics processing device comprising:
   an interface for receiving external serial video data from a Universal Serial Bus (USB) video capture device;
   a data converter connected to the interface for converting the external serial video data received from the interface into parallel video data; and
   a graphics processing unit connected to the data converter for processing the parallel video data, the graphics processing unit is further for configuring the interface and the data converter simultaneously.

2. The graphics processing device of claim 1, wherein the USB video capture device comprises a mobile telephone.

3. The graphics processing device of claim 1, wherein the graphics processing unit is further for sending a control signal to configure the data converter.

4. The graphics processing device of claim 1, wherein the USB video capture device comprises a Universal Serial Bus (USB) camera.

5. The graphics processing device of claim 1, wherein the interface comprises a Universal Serial Bus (USB).

6. The graphics processing device of claim 1, wherein the graphics processing unit is further for sending a control signal to a configuration register for configuring the data converter.

7. A method comprising:
   monitoring by a graphics processing unit whether there is a request for capturing video data from an external Universal Serial Bus (USB) video capture device;
   after detecting the request, the graphics processing unit configuring an interface and a data converter simultaneously;
   the interface receiving video data from the external USB video capture device;
   the interface transferring the video data to the data converter;
   the data converter converting the video data from serial video data into parallel video data;
   the data converter transmitting the parallel video data to the graphics processing unit; and
   the graphics processing unit processing the parallel video data;
   wherein a graphics processing device comprises the graphics processing unit, the interface, and the data converter.

8. The method of claim 7, further comprising:
   the graphics processing unit sending a control signal to a configuration register to configure the interface.

9. The method of claim 7, further comprising:
   after detecting the request, the graphics processing unit sending a control signal to a configuration register to configure the data converter.

10. The method of claim 8, wherein the interface comprises a Universal Serial Bus (USB).

11. The method of claim 8, wherein the interface is a connected to the data converter, and the graphics processing unit is connected to the data converter.

12. The method of claim 7, wherein the interface comprises a Universal Serial Bus (USB).

13. The method of claim 7, wherein the external USB video capture device comprises a Universal Serial Bus (USB) camera.

14. The method of claim 7, wherein the external USB video capture device comprises a mobile telephone.

15. A computer system comprising:
    a system bus;
    a central processing unit coupled to the system bus;
    an interface for coupling to and for receiving external serial video data from an external Universal Serial Bus (USB) video capture device;
    a data converter connected to the interface for converting the external serial video data received from the interface into parallel video data; and
    a graphics processing unit connected to the data converter for processing the parallel video data, the graphics processing unit is further for configuring the interface and the data converter simultaneously.

16. The computer system of claim 15, wherein the external USB video capture device comprises a mobile telephone.

17. The computer system of claim 15, wherein the graphics processing unit is further for sending a control signal to configure the data converter.

18. The computer system of claim 15, wherein the external USB video capture device comprises a Universal Serial Bus (USB) camera.

19. The computer system of claim 15, wherein the interface comprises a Universal Serial Bus (USB).

20. The computer system of claim 15, wherein the graphics processing unit is further for sending a control signal to a configuration register for configuring the interface.

* * * * *